Aug. 3, 1954 A. H. SEPAHBAN 2,685,682

PLAYBACK CIRCUIT

Filed March 30, 1953

INVENTOR
AMIR HASSAN SEPAHBAN
BY William J. Glover
ATTORNEY

Patented Aug. 3, 1954 2,685,682

UNITED STATES PATENT OFFICE 2,685,682

PLAYBACK CIRCUIT

Amir Hassan Sepahban, New York, N. Y., assignor to Monroe Calculating Machine Company, Orange, N. J., a corporation of Delaware Application March 30, 1953, Serial No. 345,480

13 Claims. (Cl. 340—174)

This invention relates to magnetic recording, especially magnetic spot recording as practiced in electronic computers and other data processing devices, and is particularly concerned with means for reproducing magnetically recorded data.

One of the most common of the magnetic recording devices found in electronic computers and the like is a magnetic drum consisting of a rotating cylinder having a magnetizable peripheral surface which is divided, theoretically, into a series of contiguous circumferential tracks or channels. Data is recorded on the drum, one or more words per channel, through the media of recording heads, each located in immediate proximity to the surface of a said channel. Assuming the rotational speed of the drum to be constant, each revolution thereof consumes a definite number of equal time periods during each of which a different spot, cell or area of each channel is located adjacent the associated recording head for magnetization thereby. Usually spots are magnetized with one polarity to represent binary one and with the opposite polarity to represent binary zero. Each channel may also be provided with a playback head to effect reproduction of the data recorded in the channel, but where the number of channels is large this involves considerable expense. Instead, the recording head for each channel is also used as a playback head, and switching means are provided for connecting each head alternatively with a recording circuit or a playback circuit, depending on which operation is desired. The record circuit, of course, is a power circuit adapted to apply a relatively large current pulse to the head to effect recording. On the other hand, the playback circuit is a relatively sensitive amplifier and detector adapted to amplify the minute "sine-wave-like" signals induced in the head as the magnetized spots move by the pole piece gap thereof, and to detect the identity of said signals, that is, to determine whether the same represent binary one or binary zero. The identity detection means may be in the form of a coincidence circuit which is conditioned for operation by accurately timed sense or playback pulses which occur, during each time period, at the same time as that at which the peak of either the leading or lagging lobe of the playback signal, whichever is more convenient, is applied to the coincidence circuit. The polarity of said peak which, of course, is dependent on the polarity of the magnetic spot which effected generation of the same, determines the mode of operation of the coincidence circuit and the output of the latter signifies binary one or binary zero as the case may be. This arrangement, of course, necessitates accurate placement of the magnetized spots if the coincident action discussed above is to be obtained during each and every time period. Such accuracy is readily obtained by using sharp recording pulses having a fixed relation to the sense or playback pulses to time the operations of the recording circuits.

The magnetic drum system just above described operates satisfactorily except when an attempt is made to play back with one head while recording with an adjacent head. When this mode of operation is attempted the signals induced in the playback head as the result of magnetized spots passing thereby, are swamped by noise induced in the head by interference flux radiated from the recording head. The noise to signal ratio has been found to be as high as 4000 to 1 (60 volt noise, 15 mv. signal) with the heads spaced apart 1 cm.

Known methods for coping with this noise problem involve the use of elaborate shielding and so-called "bucking pole pieces" which are arranged to be affected only by the radiated flux and not by the magnetized spots, and which have their coils wound oppositely to the coils of the playback heads so that the noise induced in one of the former cancels that induced in one of the latter when the two are connected in series. Another method is to space the interfering heads as far apart as possible. None of these methods has proven entirely satisfactory. Elaborate shielding and spacing apart of the interfering heads pose mechanical problems which sometimes make these methods impractical. And the use of bucking pole pieces is complicated by the difficulty of locating a bucking pole piece in a position wherein it is not affected at all by the magnetized spots but in which it is affected to the same extent as the associated playback head by the radiated flux.

Another method of coping with the noise problem consists in operating the playback detection means, before or after the noise is applied thereto, to sense the early or late portion of the playback signal. This method has not proven entirely satisfactory because the noise persists for some time after the termination of the recording signal which initiates the same, and, also, because noise of large magnitude causes the playback amplifiers, which are designed to amplify the relatively minute playback signals, to draw rather large grid currents which charge the condensers of the RC couplings to the amplifier grids. The RC couplings are also designed to accommodate the relatively minute playback signals and as a result have relatively large time constants which make it impossible for the condensers to discharge prior to the application of the next playback signal to the amplifiers. This, of course, severely limits the control which may be exercised over the amplifiers by the playback signals if, in fact, the latter are not entirely nullified by the charges on the condensers.

The principal object of the present invention, therefore, is to provide a playback circuit capable of amplifying the minute playback signals induced in the associated head and detecting the identity thereof (binary one or binary zero), while attenuating and discarding any noise induced in the head as the result of radiated flux even though said noise is of much greater magnitude than the said signals.

In the playback circuit of the invention the detection means are operated to detect or sense the identity of each playback wave prior to the arrival at said means of the noise superimposed on said signal, and the amplitude of the noise is reduced to a point at which it is incapable of effecting harmful charging of the coupling condensers for the amplifiers. Further, to permit sensing of the playback signals at the peaks of the leading lobes thereof, even though the noise may occur coincidentally with said peaks or even prior thereto, application of the noise to the detection means is delayed in time until sensing has been secured.

The means for carrying out the above program operate in accordance with three general principles for discriminating between signals and noise, namely, amplitude discrimination, frequency discrimination and phase discrimination.

Amplitude discrimination involves the amplifying of the playback signals and the attenuation or clipping of noise which is of greater magnitude than the playback signals, and is accomplished by a saturable core transformer interposed between a playback head and the amplifier circuit associated therewith, and by a so-called "starved" pentode included in the amplifier circuit.

Frequency discrimination involves the attenuation and/or delaying of noise which is of a substantially higher frequency than the playback signals, and is accomplished by the saturable core transformer which is frequency discriminative as well as amplitude discriminative, and by the RC circuits composed of the anode resistors of the amplifiers and the stray capacitance between the same and ground.

Phase discrimination involves the sensing of the playback signal prior to the arrival at the detection means of the noise and is accomplished by using the record timing pulses which initiate the generation of the noise to operate the detection means, and by using the frequency discriminative anode RC circuits of the amplifiers to delay the noise more than the playback signals.

Other objects and features of the invention will become apparent from the following description when read in the light of the drawing of which:

Figures 1, 2, 3:
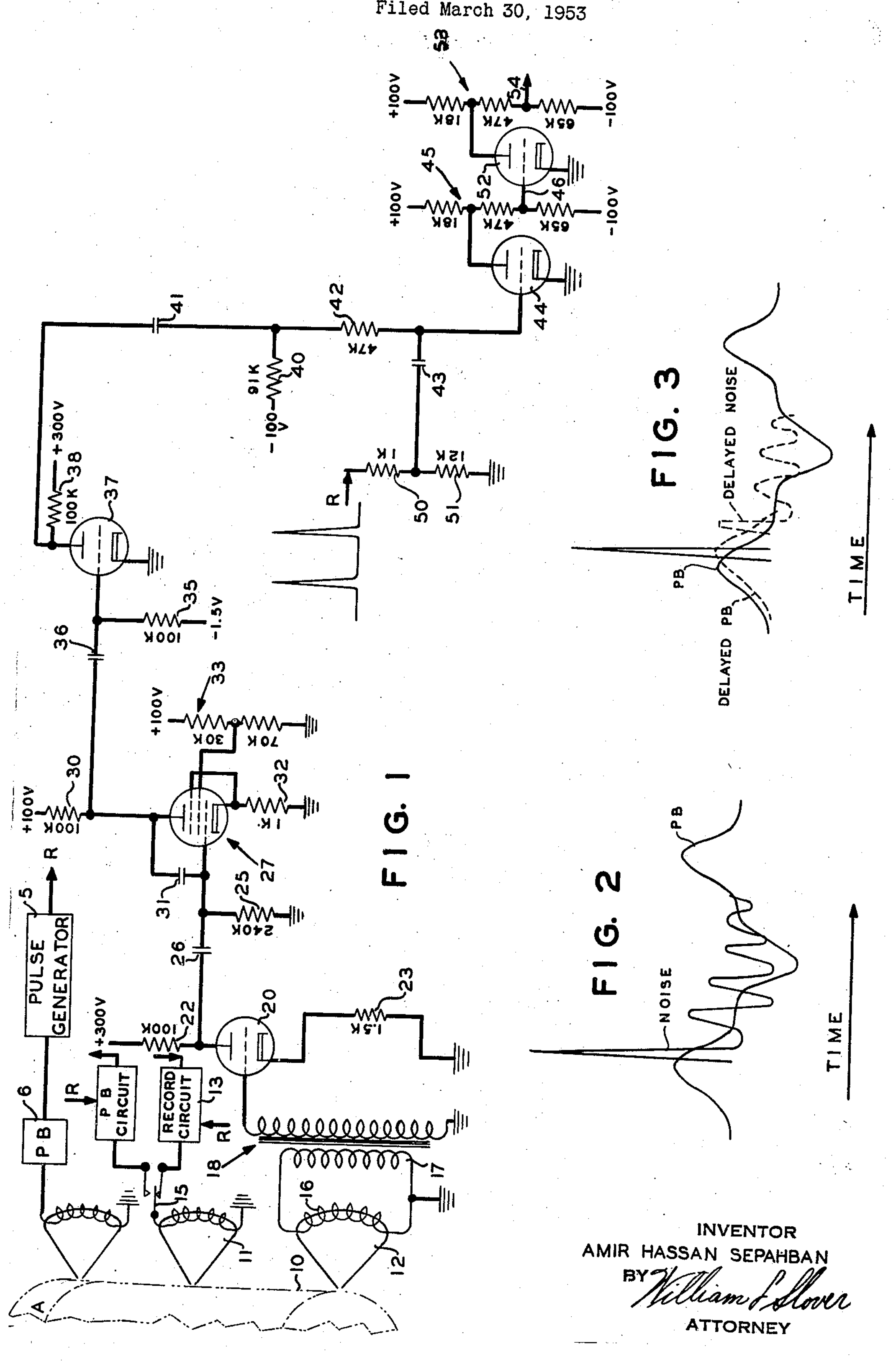
Fig. 1 is a schematic wiring diagram of an illustrative embodiment of the means of the invention.
Fig. 2 is an idealized wave diagram illustrating a playback signal with noise superimposed thereon, and, Fig. 3 is an idealized wave diagram similar to Fig. 2 but illustrates the relative positions of the noise and playback waves before and after the same are delayed differentially.

Before entering into a detailed description of the playback means of the invention, it is believed advisable first to discuss the recording of magnetized spots and the nature of the spots themselves.

The recording means includes, in addition to the recording head, amplifying and coincidence detection means controlled by the comparatively low level binary one and binary zero data signals and by sharp synchronizing recording signals, to produce accurately timed pulses of short duration and of sufficient magnitude to operate the recording head to record binary ones or binary zeros. Hereinafter these pulses will be called "data recording pulses." Preferably the coincidence detection means are embodied in the last amplifier stage so that there is a minimum time delay, or no delay, between the occurrence of a recording signal and the application of the resultant data recording pulse to the recording head.

Each recording head comprises a coil to which the said data recording pulses are applied to effect current flow in opposite directions for binary one and binary zero, and a core or pole piece on which the coil is wound, said pole piece being so mounted that a narrow air gap therein is located in close proximity to the magnetizable surface of the drum. Preferably the air gap and the spacing of the pole piece from the surface of the drum are of the order of approximately .001–.003 inch. Because of the proximity of the pole piece air gap to the magnetizable surface of the drum, leakage flux at the air gap passes through said surface and permanently magnetizes a minute spot or area thereof each time a data recording pulse is applied to the coil. The polarity of the magnetized spot is, of course, dependent on the direction in which the flux flows in the pole piece. Due to spreading of the leakage flux beyond the narrow width of the air gap, the size of the spot which is magnetized at any instant is greater than the width of the air gap. Further, as the drum is rotating during the finite time for which flux flows in the head in response to a data recording signal, the overall size of a magnetized spot is substantially greater than the width of the air gap. Therefore, when, on a subsequent rotation of the drum, the recoding head is used as a playback head, the leading lobe of the signal induced in the coil of the head as said spot moves by the latter, begins some time before the associated recording signal occurs and the lagging lobe of the signal ends some time after the latter does. This relation is shown diagrammatically in Fig. 2 wherein the noise resulting from a recording operation with one head, is superimposed on the playback signal induced in an adjacent head. The large sharp peak of the noise represents the data recording pulse applied to the recording head and occurs at substantially the same time thereas. It is to be noted that, whereas in Fig. 2 this sharp noise peak occurs a short time after the peak of the leading lobe of the playback wave, it may occur coincidentally with the peak of the latter, as shown in Fig. 3, or before said peak, or later than shown in Fig. 2. It is also to be noted that, as shown in Fig. 2, the noise persists for some time after the sharp peak thereof occurs.

Preferably the recording signals which time the operations of the recording heads are produced by suitable means 5 under control of the output of the playback circuit 6 for a master channel or track A of the drum which contains a full complement of magnetized spots. In the following description it will be assumed that the recording signals are of 2–6 microseconds in duration and have a repetition rate of 10,000 cycles per second. It will also be assumed that the density of the magnetized spots in each channel is approximately 16 per peripheral inch and that interfering record and playback heads are spaced apart approximately one centimeter. Further, a playback signal indicative of binary one is assumed to have a positive leading lobe while a signal indicative of binary zero has a negative leading lobe. It is to be understood, of course, that these assumptions are made to facilitate an understanding of the invention and are not to be construed as limiting the scope thereof.

Referring now to Fig. 1, there is illustrated a magnetic drum 10 having a pair of reading-recording heads 11 and 12 associated therewith. For purposes of description, head 11 is shown as being under the control of a record circuit 13 while head 12 is shown as cooperating with the playback circuit of the invention, although it will be understood that each head is connectable at will with a record circuit or a playback circuit. This is shown in connection with head 11 which may be disconnected from record circuit 13 and connected with a playback circuit 14 through the medium of a switch 15.

Head 12 comprises a core, and a coil 16 which is connected at either end to the primary coil 17 of a saturable core transformer 18, and also has one end grounded. The secondary of transformer 18 has one end connected to ground and the other end connected to the grid of a triode 20. Transformer 18 is designed to amplify signals of substantially the same magnitude and frequency as the playback signals but to be driven into saturation by signals of larger magnitude and thereby to attenuate or clip the latter. Of course, where the frequency of the larger signals is substantially higher than that of the playback signals, as is the case with noise from an adjacent record head, a substantial attenuation is effected by the core losses which increase with frequency. In practice, a signal gain of 3 to 1 and an overall gain of 15–30 to 1 in signal to noise ratio has been obtained with a ½" diameter, .001 inch supermalloy tape wound core transformer having a turns ratio of 220 to 650.

Triode 20 (Fig. 1) is connected to operate as a class A amplifier and has its anode connected through a resistor 22 to a source of anode supply. Any suitable biasing means may be provided, for example, the triode may have its cathode connected through a bias resistor to ground. The anode of the triode is also connected through an A. C. coupling comprising a resistor 25 and a condenser 26 to the control grid of a high gain pentode 27 which is connected for substantially so-called "starved pentode" operation. The anode of the pentode is connected through a large resistor 30 with a rather low source of positive potential, say +100 volts, and through a small condenser 31 with the control grid thereof. The cathode of the pentode is connected through a resistor 32 to ground, and the suppressor grid is coupled to the cathode. The screen grid of the pentode is connected to a voltage divider 33 connected between said +100 volt source and ground, and is maintained thereby at a potential of, say +60–+90 volts.

The large anode resistor 30 and the low potential of the screen grid of the pentode cause the anode of the latter to operate near its current saturation point, where it can draw only a small amount of current. Thus, a high gain is provided for signals of low magnitude (amplified playback signals from tube 20) which do not drive the anode to saturation, while noise signals of large magnitude which do drive the anode into saturation are suppressed or clipped. Negatively directed noise signals of large magnitude drive the control grid of the pentode below the cutoff point and thus are also clipped or suppressed. The condenser 31 serves to prevent oscillation of the circuit in response to high frequency oscillatory noise by providing a high frequency negative feedback path to the control grid of the pentode. This negative feedback does not affect the playback signals as the latter are of much lower frequency than the noise.

The output of pentode 27 is connected through an A. C. coupling comprising a resistor 35 and a condenser 36 with a second triode amplifier 37 having its cathode grounded and its anode connected through a resistor 38 with a source of anode potential, say +300 volts. A biasing potential suitable to prevent clipping of the positive lobes of the playback signals is applied to the tube in whatever way is convenient, for example, it may be applied to the resistor 35 of the A. C. coupling.

Amplifier 37 serves merely to amplify the output of pentode 27, both the playback signals and the clipped noise. The output of this amplifier is connected through an A. C. coupling comprising a resistor 40 and a condenser 41 with a coincidence detector or gate, which may conveniently be of the RC type, and which comprises a resistor 42 and a condenser 43 connected to the grid of a triode 44. The purpose of this coincidence gate is to sense the leading lobe of each playback signal under control of an accurately timed sensing pulse to determine whether the signal represents binary one or binary zero. The anode of triode 44 is applied to the juncture of the two most positive sections of a three section voltage divider 45 connected between sources of + and − 100 volt potentials and having an output line 46 extended from a center tap thereof. The connections are such that when the grid of triode 44 is maintained below the cutoff potential (say −6 or −7 volts) the output line 46 of voltage divider 45 assumes a potential of approximately zero volts. However, when the potential of said grid is raised above the cutoff point, say to zero volts, the potential of said output line drops to approximately −20 volts. A speed-up condenser may be connected across the 47K resistor of voltage divider 45 to improve the gain for high frequency signals.

Triode 44 is normally maintained in the cutoff condition by a bias potential applied to the resistor 40 of the A. C. coupling between said tube and the amplifier 37. Conduction of the tube is achieved only when a positive signal applied to the A. C. coupling 40, 41, and a positive sense pulse applied to the RC coincidence circuit 42, 43, 44 combine to overcome the effect of the bias applied to resistor 40. Evidently, therefore, the bias applied to resistor 40 must be of sufficient magnitude not to be overcome by a positive playback signal or a sense pulse, alone. The sense pulses which, as will be pointed out in more detail hereinafter, are the recording signals applied to the record circuits to time recording, are applied to an attenuator comprising resistors 50 and 51 connected between the signal source and ground and having their juncture applied to the condenser 43. Of course, if the sense pulses do not require attenuating they may be applied directly to the condenser 43.

Output line 46 of gate 44 is applied to an inverter triode 52 having its anode connected to a voltage divider 53 identical with the divider 45. The purpose of inverter 52 is to invert the output signals on line 46, that is, to produce on an output line 54 thereof potentials of 0 and −20 volts when line 46 assumes potentials of −20 and 0 volts respectively.

It is believed evident that the described means amplify the playback signals induced in the playback head 12 and attenuate the noise induced by interference which may originate in an adjacent record head, at least to the point where it is of no greater magnitude than the playback signals. This attenuation effectively curtails charging of the coupling condensers 26, 36 and 41, due to grid current flow, and swamping of subsequent low level playback signals by the noise as was the case in prior playback circuits. It is to be mentioned that in some instances the magnitude of the noise applied to the coupling condenser 26 between amplifier 20 and pentode 27 may be sufficient to effect harmful charging thereof. When this condition exists it can be remedied by connecting a damping resistor across the secondary of transformer 18. In addition to attenuating the noise, however, it is also necessary to differentiate between the amplified signal and the attenuated noise at the coincidence detector in order to permit of an accurate determination of the identity of each playback signal, that is, binary one or binary zero.

This differentiation is accomplished by using the recording signals which initiate the noise, to time the operations of the coincidence detector 42, 43, 44, and by delaying the passage of the noise through the stages of the playback circuit preceding the detector. Thus, the noise does not reach the detector until after the same has operated to produce a signal indicative of binary one or binary zero, and is unable to affect the operation of the detector. For optimum results it is desired that the means which are provided to delay the noise be frequency discriminative, so that the high frequency noise is delayed substantially more than are the comparatively low frequency playback signals. To this end an LC delay line may be included in the circuit. In practice, however, it has been found that the frequency discriminative RC circuits comprising the three anode resistors 22, 30 and 38 (Fig. 1) and the stray capacitances between the same and ground provide an adequate delay network. The operation of the frequency discriminative delay means is illustrated diagrammatically in Fig. 3 wherein a playback signal and the noise peak superimposed thereon are shown in full lines as they appear in the playback head, and in dotted lines as they appear, after being delayed, at the coincidence detector. As shown, the noise peak is delayed substantially more than the playback signal. Remembering that the undelayed noise peak shown in full lines in Fig. 3 occurs at the same time as the recording signal which initiates the same, it can readily be seen that the recording signal occurs at, or near, the peak of the leading lobe of the delayed, or dotted line, playback wave. This permits of the recording signal and the said leading playback signal lobe being combined to exert the desired control over gate 44 (Fig. 1).

When the said leading lobe is positive, the gate 44 conducts and cuts off inverter 52 which produces a high output (0 volts) indicative of binary one. But when said leading lobe is negative the gate 44 is not caused to conduct and the output of inverter 52 remains at its normal level of −20 volts which indicates binary zero.

The output of inverter 52 may be used in any desired way, for example, when it assumes the high potential of zero volts it may operate means for setting a flip-flop to indicate binary one. Of course, when this mode of operation is desired, means must also be provided to effect setting of the flip-flop to the opposite or binary zero state at appropriate times. However, these means form no part of the present invention and need not be described further.

It will be seen, therefore, that the means of the invention are capable of amplifying a minute playback signal and of determining the nature thereof as binary one or binary zero while attenuating and discarding noise which is of much greater magnitude than the playback signal.

Suggested values for the circuit components and suggested tube types are indicated in Fig. 1. However, the means of the invention are not limited to said values or said tube types.

While there has been above described but a single embodiment of the invention, it is believed evident that many changes or modifications can be made therein without departing from the spirit of the invention and it is not desired, therefore, to limit the scope of the invention except as set forth in the appended claims or as dictated by the prior art.

I claim:

1. The combination of a magnetic drum on which data is recorded in the form of magnetized spots in each of a plurality of contiguous peripheral channels, a recording and playback head for each of at least a pair of said channels, each head including a coil which is pulsed to magnetize spots in its associated channel and in which signals are induced by the magnetized spots, a recording circuit connected with one of said heads to pulse the same, means for producing sharp recording signals to time the operations of said recording circuit, and a playback circuit connected with the other head and including a saturable core transformer driven by the coil of the head and adapted to amplify playback signals and to attenuate noise of higher frequency and greater magnitude than the former, as both are induced in said coil, said noise being produced by the record circuit and being timed by said recording signals, an amplifier driven by said transformer, a starved pentode driven by said amplifier and adapted to clip noise peaks of greater magnitude than the playback signals while amplifying the latter, a second amplifier driven by said pentode, a coincidence detector controlled jointly by the second amplifier and by said recording signals, A. C. couplings between said amplifiers and the preceding and succeeding stages, and delay means in the playback circuit for delaying the noise between said transformer and said detector, whereby the noise does not reach the detector until after said recording signal has occurred.

2. The combination of a magnetic drum on which data is recorded in the form of magnetized spots in each of a plurality of contiguous peripheral channels, a recording and playback head for each of at least a pair of said channels each head including a coil which is pulsed to magnetize spots in its associated channel and in which signals are induced by the magnetized spots, a recording circuit connected with one of said heads to pulse the same, means for producing sharp recording signals to time the operations of said recording circuit, and a playback circuit connected with the other head and including a saturable core transformer driven by the coil of the head and adapted to amplify playback signals and to attenuate noise of higher frequency and greater magnitude than the former, as both are induced in said coil, said noise being produced by the record circuit and being timed by said recording signals, an amplifier driven by said transformer, a starved pentode driven by said amplifier and adapted to clip noise peaks of greater magnitude than the playback signals while amplifying the latter, a second amplifier driven by said pentode, a coincidence detector controlled jointly by the second amplifier and by said recording signals, A. C. couplings between said amplifiers and the preceding and succeeding stages, and frequency discriminative delay means in the playback circuit for delaying the higher frequency noise substantially more than the playback signal between said transformer and said detector, whereby the noise does not reach the detector until after said recording signal has occurred, the last said means including an R. C. circuit for each amplifier and for said pentode, each R. C. circuit consisting of an anode resistor and stray capacitance between the same and ground.

3. A magnetic recording system playback circuit capable of amplifying a playback signal induced in the coil of a playback head and of determining the identity thereof as binary one or binary zero while suppressing noise of greater magnitude and higher frequency which is superimposed on the playback signal, comprising a frequency and amplitude discriminative saturable core transformer driven by the said coil and adapted to amplify the signal and attenuate the noise, an amplifier driven by the transformer, a starved pentode driven by the amplifier and adapted to clip noise peaks of greater magnitude than the playback signal while providing high gain for the latter, a second amplifier driven by the pentode, a coincidence detector controlled jointly by the second amplifier and by sense pulses occurring at the same time as said noise, means for producing said pulses, A. C. couplings between said amplifiers and the preceding and succeeding circuit elements, and delay means in the playback circuit for delaying noise between said transformer and said detector, whereby, at the latter, the noise and the said pulses do not occur at the same time.

4. The combination according to claim 3 wherein the delay means comprises an R. C. circuit for each amplifier and for said pentode, each said R. C. circuit consisting of an anode resistor and stray capacitance between the same and ground.

5. In a magnetic recording system, a playback circuit capable of amplifying a playback signal induced in the coil of a playback head and of determining the identity thereof as binary one or binary zero while suppressing noise of greater magnitude and higher frequency which is superimposed on the playback signal, the combination with one or more amplifiers for amplifying the signals induced in said head and a coincidence detector to which the amplified playback signals are applied to identify the same as binary one or binary zero, of an amplitude and frequency discriminative, preamplifier, saturable core transformer adapted to amplify the playback signal and attenuate the noise, a starved pentode in series with the amplifiers and the detector and adapted to clip noise peaks of greater magnitude than the playback signal as applied thereto while amplifying the latter, means for applying sharp sense pulses which occur at the same time as the noise, to said coincidence detector to time the operation thereof, and frequency discriminative delay means for delaying the noise substantially more than the playback signal between the said coil and the coincidence detector.

6. The combination according to claim 5 and including A. C. couplings between the several stages of the circuit.

7. The combination according to claim 6 wherein the delay means includes an R. C. circuit for each amplifier and for said pentode, each said R. C. circuit consisting of an anode resistor and stray capacitance between the same and ground.

8. A playback circuit capable of amplifying a playback signal induced in the coil of a playback head and of determining the identity thereof as binary one or binary zero while suppressing noise of greater magnitude and higher frequency which is superimposed on the playback signal, comprising frequency and amplitude discriminative means driven by the said coil and adapted to amplify the signal and attenuate the noise, an amplifier driven by said means, means driven by the amplifier and adapted to clip noise peaks of greater magnitude than the playback signal signal while providing high gain for the latter, a second amplifier driven by the last said means, a coincidence detector controlled jointly by the second amplifier and by sense pulses occurring at the same time as said noise, means for producing said pulses, A. C. couplings between said amplifiers and the preceding and succeeding circuit elements, and frequency discriminative delay means in the playback circuit for delaying the higher frequency noise substantially more than the playback signal, between said coil and said detector, whereby, at the latter, the noise and the said pulses do not occur at the same time.

9. A playback circuit capable of amplifying a playback signal induced in the coil of a playback head and of determining the identity thereof as binary one or binary zero while suppressing noise of greater magnitude and different frequency which is superimposed on the playback signal, comprising means for amplifying the playback signal, frequency and amplitude discriminative means for reducing the magnitude of the noise at least to substantially that of the amplified playback signal, a coincidence detector to which the amplified signals and the noise are applied, means for applying a sense pulse which occurs at the same time as said noise to the coincidence detector to time the operation thereof, and means for delaying the noise between said coil and said detector.

10. A playback circuit capable of amplifying a head and of determining the identity thereof as playback signal induced in the coil of a playback binary one or binary zero while suppressing noise of greater magnitude and different frequency which is superimposed on the playback signal, comprising means for amplifying the playback signal, frequency and amplitude discriminative means for reducing the magnitude of the noise at least to substantially that of the amplified playback signal, a coincidence detector to which the amplified signals and the noise are applied, means for applying a sense pulse which occurs at the same time as said noise to the coincidence detector to time the operation thereof, means for delaying the noise between said coil and said detector, and A. C. couplings between the stages of the circuit.

11. The combination according to claim 10 wherein the frequency and amplitude discriminative means comprises a preamplifier saturable core transformer which amplifies the signal and attenuates the noise and a starved pentode which clips noise peaks of greater magnitude then the playback signal as applied thereto.

12. The combination according to claim 11 wherein the delay means comprises a plurality of R. C. circuits each consisting of an anode resistor and stray capacitance between the same and ground.

13. The combination according to claim 12 wherein the said starved pentode includes an anode and a control grid, and including a frequency discriminative negative feedback path between said anode and said grid.

References Cited in the file of this patent

UNITED STATES PATENTS

| Number | Name | Date |
|---|---|---|
| 2,540,654 | Cohen et al. | Feb. 6, 1951 |
| 2,595,701 | Potter | May 6, 1952 |
| 2,614,169 | Cohen et al. | Oct. 14, 1952 |